(12) United States Patent
Chambard et al.

(10) Patent No.: US 10,776,834 B2
(45) Date of Patent: Sep. 15, 2020

(54) DOMAIN SELECTION FOR ADVERTISEMENT DATA

(71) Applicant: Criteo SA, Paris (FR)

(72) Inventors: Loic Chambard, Paris (FR); Nicolas Messelet, Bordeaux (FR)

(73) Assignee: Criteo SA, Paris (FR)

( * ) Notice: Subject to any disclaimer, the term of this patent is extended or adjusted under 35 U.S.C. 154(b) by 0 days.

(21) Appl. No.: 13/942,434

(22) Filed: Jul. 15, 2013

(65) Prior Publication Data
US 2015/0019351 A1 Jan. 15, 2015

(51) Int. Cl.
*G06Q 30/02* (2012.01)

(52) U.S. Cl.
CPC ..... *G06Q 30/0277* (2013.01); *G06Q 30/0255* (2013.01); *G06Q 30/0276* (2013.01)

(58) Field of Classification Search
CPC .......... G06Q 30/0277; G06Q 30/0276; G06Q 30/0255
USPC ................. 705/14.73, 14.53, 14.72
See application file for complete search history.

(56) References Cited

U.S. PATENT DOCUMENTS

| | | | | |
|---|---|---|---|---|
| 8,898,309 | B2* | 11/2014 | Goldspink | G06F 11/3495 709/227 |
| 2001/0037292 | A1* | 11/2001 | Vogt | G06Q 20/04 705/39 |
| 2002/0120504 | A1* | 8/2002 | Gould et al. | 705/14 |
| 2003/0187923 | A1* | 10/2003 | Kimura et al. | 709/203 |
| 2006/0041638 | A1* | 2/2006 | Whittaker | G06Q 30/0267 709/219 |
| 2006/0150253 | A1 | 7/2006 | Feuerstein et al. | |
| 2007/0168506 | A1 | 7/2007 | Douglas et al. | |
| 2007/0204014 | A1* | 8/2007 | Greer | G06F 17/30017 709/219 |
| 2008/0177600 | A1* | 7/2008 | McCarthy | G06Q 10/0639 705/7.33 |
| 2009/0024737 | A1 | 1/2009 | Goldspink et al. | |
| 2009/0172091 | A1 | 7/2009 | Hamel | |
| 2010/0094704 | A1 | 4/2010 | Subramanian et al. | |
| 2010/0217797 | A1* | 8/2010 | Kirsch et al. | 709/203 |
| 2011/0125595 | A1* | 5/2011 | Neal | G06Q 30/02 705/14.73 |
| 2011/0185016 | A1* | 7/2011 | Kandasamy et al. | 709/203 |

(Continued)

OTHER PUBLICATIONS

Trademark Electronic Search System (TESS), Javascript, Oct. 3, 2013, United States Patent and Trademark Office.*

(Continued)

*Primary Examiner* — Kiersten V Summers
(74) *Attorney, Agent, or Firm* — Proskauer Rose LLP

(57) ABSTRACT

Described are methods, systems, and apparatus, including computer program products for domain selection for advertisement data in the delivery of website display ads. A request is received from a requester for indicia of one or more impression opportunities. A redirection URL and redirection type is received. One or more desired impression opportunities are determined. The indicia of the one or more impression opportunities are generated comprising indicia of the one or more desired impression opportunities. Redirection instructions are generated based on the redirection URL and redirection type. The indicia of the one or more impression opportunities and the redirection instructions are sent to the requester.

12 Claims, 8 Drawing Sheets

(56) References Cited

U.S. PATENT DOCUMENTS

| | | | |
|---|---|---|---|
| 2011/0225637 A1 | 9/2011 | Counterman | |
| 2012/0022942 A1 | 1/2012 | Holloway et al. | |
| 2012/0143713 A1* | 6/2012 | Dittus | G06Q 30/0251 705/26.3 |
| 2012/0297062 A1 | 11/2012 | Lu et al. | |
| 2012/0303453 A1* | 11/2012 | Gupta | G06Q 30/0251 705/14.53 |
| 2012/0303454 A1* | 11/2012 | Gupta | G06Q 30/0251 705/14.53 |
| 2013/0145022 A1 | 6/2013 | Srivastava et al. | |
| 2013/0275195 A1 | 10/2013 | Gabryelski et al. | |
| 2013/0339139 A1 | 12/2013 | Meyers et al. | |
| 2014/0164111 A1 | 6/2014 | Rodriguez et al. | |
| 2014/0223462 A1 | 8/2014 | Aimone et al. | |
| 2014/0316902 A1 | 10/2014 | Le Jouan | |
| 2015/0058141 A1 | 2/2015 | Yablonka et al. | |
| 2015/0154650 A1 | 6/2015 | Umeda | |

OTHER PUBLICATIONS

Trademark Electronic Search System (TESS), Blu-Ray, Oct. 3, 2013, United States Patent and Trademark Office.*

Trademark Electronic Search System (TESS), Bluetooth, Oct. 3, 2013, United States Patent and Trademark Office.*

Wikipedia the Free Encyclopedia, HTTP 302, Oct. 10, 2013, Wikipedia The Free Encyclopedia.*

Ad Ops Insider, How Does Ad Serving Work, Sep. 3, 2010, from http://www.adopsinsider.com/ad-serving/how-does-ad-serving-work/.*

Ad Ops Insider, How to Read DoubleClick Ad Tags and Ad Tag Variables, Feb. 25, 2010, http://www.adopsinsider.com/ad-ops-basics/what-are-ad-tags/.*

DoubleClick by Google, Standard Tags, Internet Archive Way Back Machine Capture date of Mar. 15, 2013 from URL: http://support.google.com:80/dfa/partner/answer/188730?hl=en.*

Ad Ops Insider, How Does Ad Serving Work?, Internet Archive WayBack Machine Capture date of Sep. 12, 2010 from URL: http://www.adopsinsider.com/ad-serving/how-does-ad-serving-work/.*

Presentation "Criteo Real Time Audience," Criteo, 10 pages, 2012.
Presentation "Criteo Real Time Audience," Criteo, 5 pages, 2012.
Presentation "Criteo Real Time Audience," Criteo, 9 pages, 2012.

* cited by examiner

DOMAIN SELECTION FOR ADVERTISEMENT DATA

FIELD OF THE INVENTION

The present invention relates generally to webpage display ads and, more specifically, to domain selection for advertisement data in the delivery of webpage display ads.

BACKGROUND

Online and other electronic advertising allows advertisers to display advertisements (or ads) to end users, including those who are potential customers. For example, a webpage can include one or more opportunities for inserting advertisements (e.g., space for a banner advertisement across the top of the webpage, spaces for advertisements along the sides of the webpage, overlays, etc.). When a user device (e.g., a computer running a web browser) processes a webpage for display, the user device can request an advertisement for one of the advertising opportunities on the webpage from an advertising server (or ad server). The ad server can select an advertisement for display within the area of the webpage associated with the advertising opportunity. For example, the ad server can select, based on declarative rules set by the publisher, a banner ad from a particular advertiser from a set of multiple banner ads from multiple advertisers for display to the user in the banner ad space of the webpage. Each presentation of an advertisement within a webpage can be referred to as an impression.

Ad networks have been developed to enable advertisers to find available advertising opportunities (e.g., spaces on webpages in which to display their ads) and to provide publishers a way to find ads to be displayed on their webpages. For example, a publisher can use a realtime bidding platform to sell an impression to an advertiser (e.g., the winning bidder advertiser can provide the advertisement that will be displayed to a user). When a user device processes a webpage for display, the web browser can request an advertisement for one of the impression opportunities on the webpage. In response to this request, the realtime bidding platform can request bids from advertisers for the impression opportunity. The realtime bidding platform can collect bids from competing advertisers and select the advertiser having the highest bid. The publisher, or one of its ad servers, can then provide to the user an ad from the advertiser having the highest bid. In some applications, advertisers can provide advertising data (e.g., data that indicates which ads on a publisher's webpage the advertiser wishes to buy) to user devices for storage. However, some publishers want to control storing of advertisement data associated with the publisher's webpages. Accordingly, there is a need for providing publishers greater control over how advertisement data is stored on user devices, such as controlling the domain with which advertisement data is associated.

SUMMARY OF THE TECHNOLOGY

The technology described herein facilitates a publisher to offer ad opportunities to an advertiser, on an impression-by-impression basis, while giving the publisher greater control over advertisement data provided by advertisers.

In one aspect, there is a method performed by a computing system. The method can include receiving, by the computing system, a request from a requester for indicia of one or more impression opportunities. The method can include receiving, by the computing system, a redirection URL and redirection type. The method can include determining, by the computing system, one or more desired impression opportunities. The method can include generating, by the computing system, the indicia of the one or more impression opportunities including indicia of the one or more desired impression opportunities. The method can include generating, by the computing system, redirection instructions based on the redirection URL and redirection type. The method can include sending, by the computing system, the indicia of the one or more impression opportunities and the redirection instructions to the requester.

In some embodiments, the redirection instructions include an HTTP response status code 302 directing the requester to the redirection URL. In some embodiments, the redirection instructions include one or more javascript instructions directing the requester to the redirection URL. In some embodiments, the redirection instructions include one or more HTML image tags directing the requester to the redirection URL. In some embodiments, the redirection instructions include a duration of time associated with the indicia of the one or more impression opportunities. In some embodiments, the redirection instructions include a subdomain level with which to associate the indicia of the one or more impression opportunities. In some embodiments, the method includes receiving, by the computing system, one or more keywords associated with the one or more impression opportunities from the requester. In some embodiments, the indicia of the one or more impression opportunities include one or more keywords associated with an ad server.

In another aspect, there is a method performed by a computing system. The method can include sending, by the computing system, a request including a redirection URL and a redirection type to an ad decision system for indicia of one or more impression opportunities. The method can include receiving, by the computing system, the indicia of the one or more impression opportunities and redirection instructions from the ad decision system. The method can include sending, by the computing system, the indicia of the one or more impression opportunities to the redirection URL as specified by the redirection instructions. The method can include receiving, by the computing system, association instructions from the redirection URL. The method can include associating, by the computing system, the indicia of the one or more impression opportunities as specified by the association instructions.

In some embodiments, the redirection instructions include an HTTP response status code 302 directing the computing system to the redirection URL. In some embodiments, the redirection instructions include one or more javascript instructions directing the computing system to the redirection URL. In some embodiments, the redirection instructions include one or more HTML image tags directing the computing system to the redirection URL. In some embodiments, the redirection instructions include a duration of time associated with the indicia of the one or more impression opportunities, and the association instructions to associate the indicia of the one or more impression opportunities with a domain associated with the redirection URL for the duration of time. In some embodiments, the redirection instructions include a subdomain level with which to associate the indicia of the one or more impression opportunities. In some embodiments, the method includes sending, by the computing system, one or more keywords associated with the one or more impression opportunities to the ad decision system. In some embodiments, the indicia of the one or more impression opportunities include one or more keywords associated with an ad server. In some embodiments, the method includes storing the indicia of the one or more impression opportunities as a browser cookie set on a domain associated with the redirection URL.

In another aspect, there is a method performed by a computing system. The method can include sending, by the computing system, to a requestor a webpage from a first domain including instructions to request indicia of one or more impression opportunities from an ad decision system. The method can include receiving, by the computing system, on a second domain indicia of one or more impression opportunities from the requestor. The method can include sending, by the computing system, association instructions from the second domain to the requester to associate the indicia of one or more impression opportunities with the second domain.

In some embodiments, the method includes receiving a duration of time associated with the indicia of the one or more impression opportunities, and the association instructions include instructions to associate the indicia of the one or more impression opportunities with the second domain for the duration of time. In some embodiments, the association instructions include a subdomain level with which to associate the indicia of the one or more impression opportunities. In some embodiments, the indicia of the one or more impression opportunities include one or more keywords associated with an ad server. In some embodiments, the association instructions include instructions directing the requester to store the indicia of the one or more impression opportunities as a browser cookie on the second domain.

Other aspects and advantages of the present invention will become apparent from the following detailed description, taken in conjunction with the accompanying drawings, illustrating the principles of the invention by way of example only.

BRIEF DESCRIPTION OF THE DRAWINGS

The foregoing and other objects, features, and advantages of the present invention, as well as the invention itself, will be more fully understood from the following description of various embodiments, when read together with the accompanying drawings, in which.

DETAILED DESCRIPTION

The technology described herein relates generally to domain selection for advertisement data used in the delivery of webpage display ads.

In an exemplary implementation of the technology, a user device (e.g., a computer running web browser software) can request a webpage from a publisher webserver. The publisher webserver can provide a webpage with one or more spaces for advertisements (e.g., one or more impression opportunities) in response to the user device's request. The webpage can include instructions for performing various actions. When the user device processes the webpage for display, the user device can request from an ad decision system indicia of impression opportunities for which the ad decision system determines it can provide ads. For example, the ad decision system can determine to provide an ad for an impression opportunity when it determines that impression opportunity is likely profitable (e.g., the expected value of the impression opportunity exceeds the cost of the impression opportunity).

The ad decision system can provide indicia of the one or more impression opportunities that are desired (e.g., indicia of the one or more impression opportunities for which the ad decision system determines it can provide ads), along with redirection instructions that redirect the user device to a redirection URL (e.g., a redirection URL identified in the publisher's webpage). The user device can, when processing the redirection instructions, pass the indicia of one or more impression opportunities, and receive storage instructions from a computing system at the redirection URL. The computer system at the redirection URL can provide storage instruction to the user device (e.g., instructing the user device to store the indicia as a cookie set on the domain of the redirection URL). The user device can store the indicia of the one or more impression opportunities in accordance with the storage instructions. Beneficially, the use of the redirection URL permits the publisher to control on which domain the user device sets the cookie containing the indicia of one or more impression opportunities.

Subsequently, the user device can request a second webpage (e.g., 3 minutes later) from the publisher webserver. When requesting ads for insertion into the impression opportunities on the second page, the user device can pass the stored indicia of the one or more impression opportunities to the publisher ad server, which informs the publisher ad server that the ad decision system is willing to provide ads for those impression opportunities. The publisher ad server can select ads for the impression opportunities (either ads that will be provided by the ad decision system or ads associated with another advertiser) and deliver the ads (or ad tags directing the user device to where the ad can be retrieved) to the user device for display in the webpage.

Figure 1:
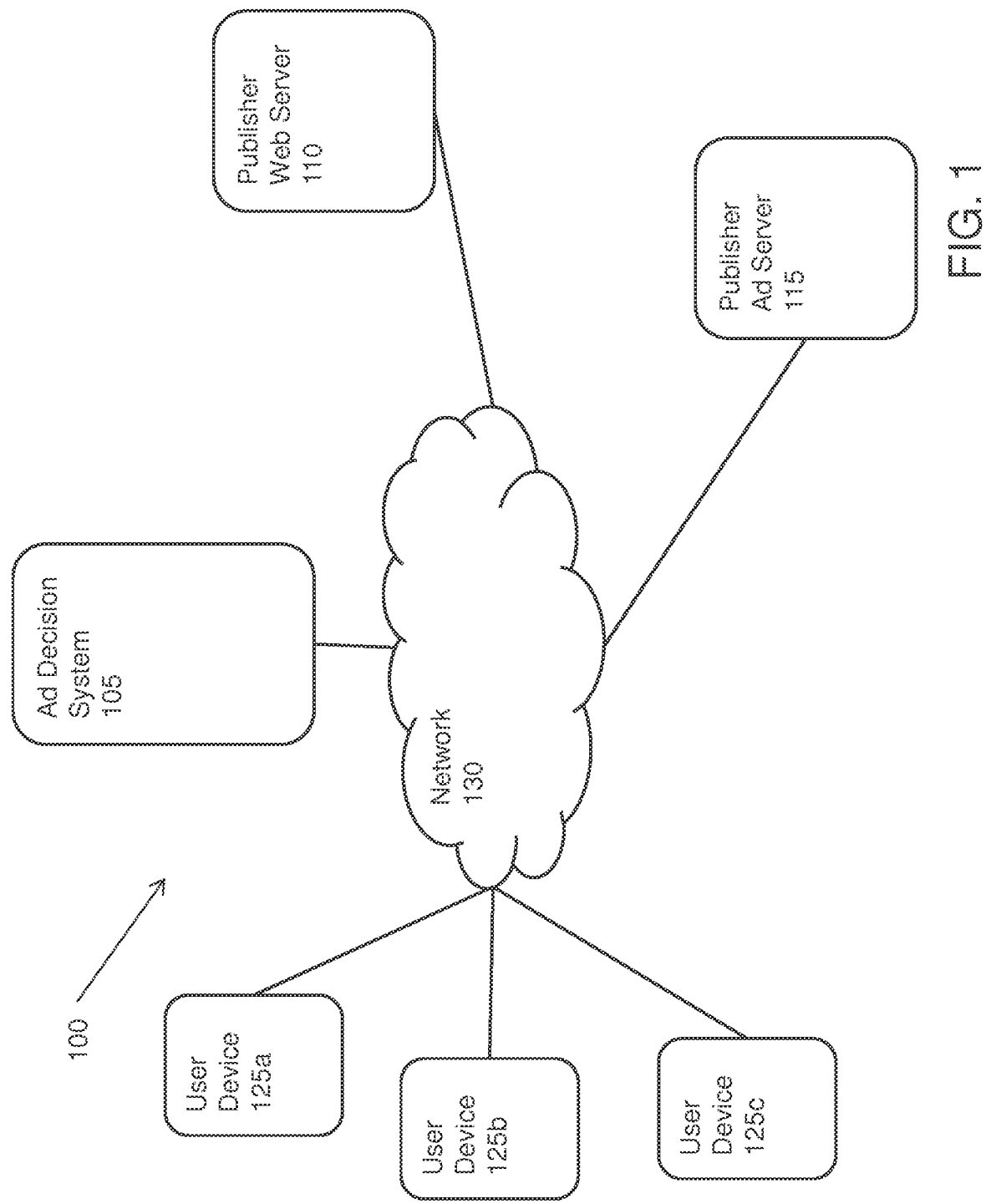
FIG. 1 is a diagram of a system in accordance with an embodiment of the technology.

FIG. 1 is a diagram of system 100 in accordance with an embodiment of the technology. As illustrated, system 100 can include an ad decision system 105, publisher webserver 110, publisher ad server 115, and user devices 125. In system 100, ad decision system 105, publisher webserver 110, publisher ad server 115, and user devices 125 can be in data communication with each other via network 130.

Ad decision system 105 can be any computing system comprising one or more computing devices, such as servers. In some embodiments, ad decision system 105 can evaluate impression opportunities to determine the desirability of the impression opportunities. For example, ad decision system 105 can determine whether it is desirable to purchase an impression opportunity based on data related to the impression opportunity. In some embodiments, ad decision system 105 can determine it is desirable to purchase an impression opportunity when the price an advertiser is willing to pay for the impression opportunity exceeds the price of the impression opportunity. In some embodiments, ad decision system 105 can determine it is desirable to purchase an impression opportunity when the expected value of the impression opportunity (e.g., based on estimated likelihood of the user clicking on the ad) exceeds the cost of the impression opportunity. The data related to the impression opportunity can include historical, demographic, or behavioral information about the end user to which the ad will be displayed, information about the webpage on which the ad will be displayed, information about the advertiser, or any other relevant information.

Publisher webserver 110 can be any computing system comprising one or more computing devices, such as servers. In some embodiments, publisher webserver 110 can serve webpages (e.g., to user devices 125). Publisher ad server 115 can be any computing system comprising one or more computing devices, such as servers. In some embodiments, ad server 115 can serve ads or ad tags (e.g., HTML ad tags, such as JAVASCRIPT™ code or an Iframe) (e.g., to user device 125). User device 125 can be any computing system comprising one or more computing devices, such as personal computers. In some embodiments, user device 125 can request webpages.

Ad Selection and Delivery

Figure 2A:
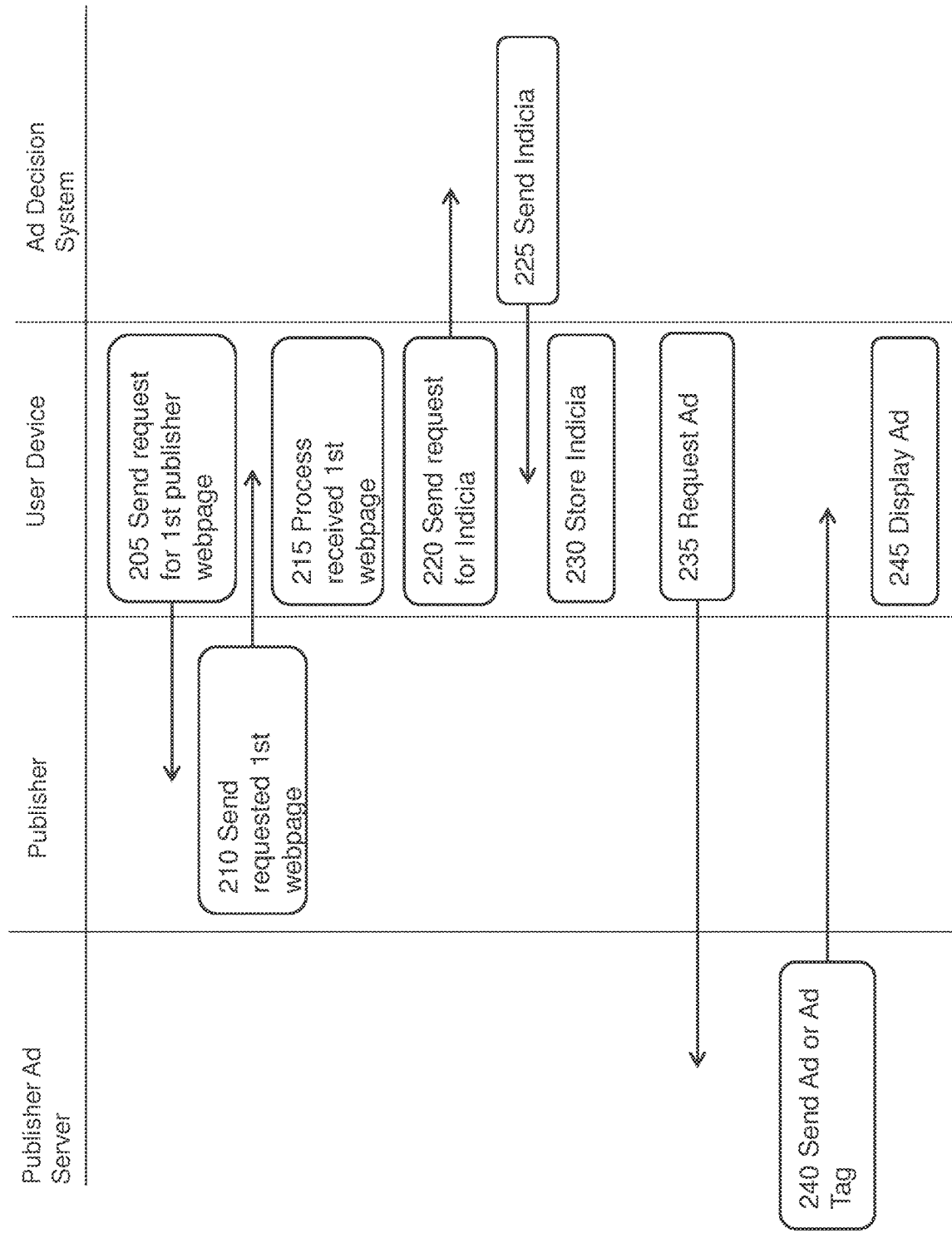
FIGS. 2A and 2B depict a flow chart illustrating a method of providing ads to a user device in accordance with an embodiment of the technology.
Figure 2B:
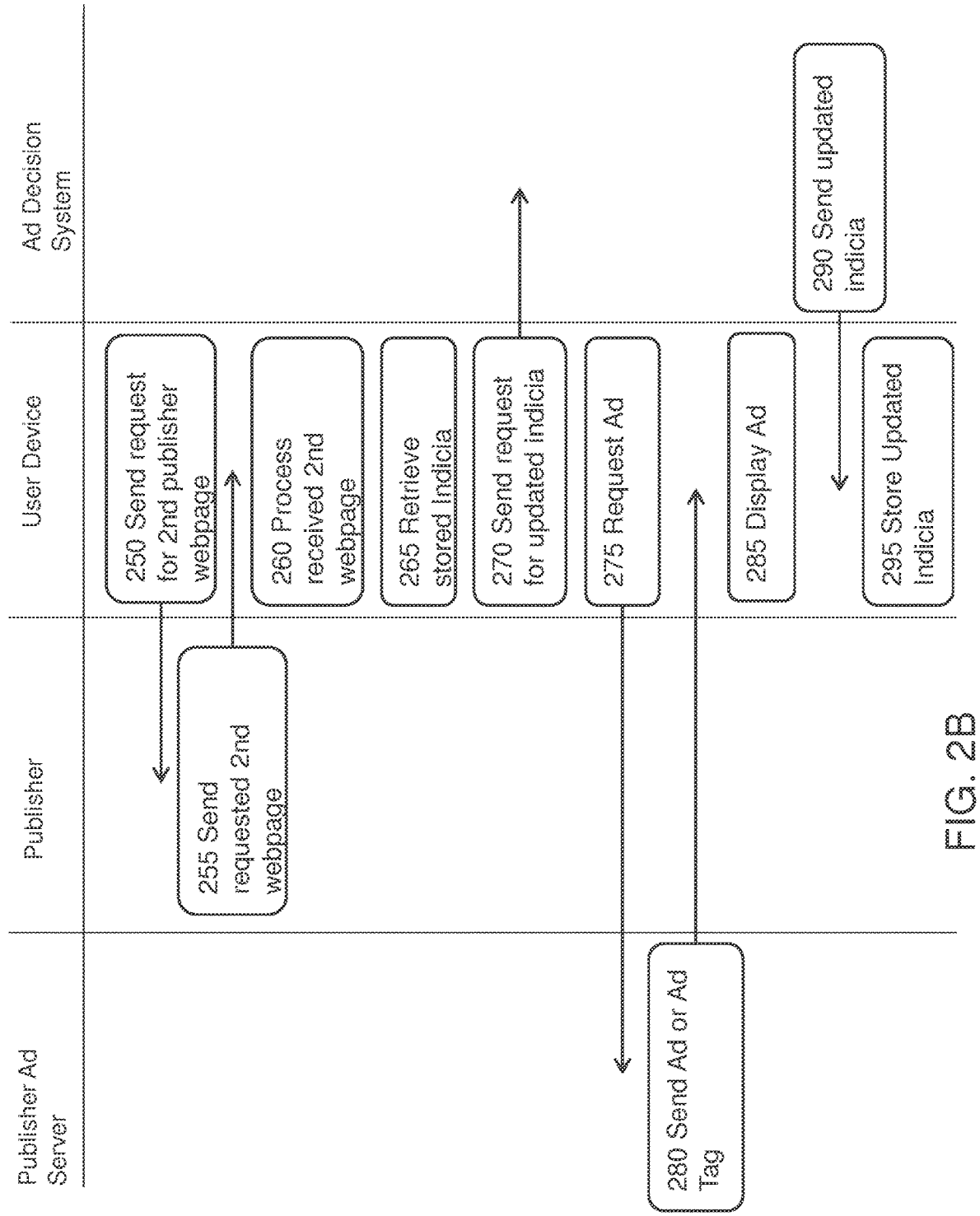

FIGS. 2A and 2B depict a flow chart illustrating a method of providing ads to a user device in accordance with an embodiment of the technology. At step 205, a user device (e.g., user device 125) sends a request for a first webpage to a publisher webserver (e.g., webserver 110). In some embodiments, the request can be in accordance with the HTTP protocol (e.g., an HTTP GET method). At step 210, the publisher webserver sends the requested first webpage to the user device. In some embodiments, the response can be in accordance with the HTTP protocol. At step 215, the user device processes the first webpage. For example, the user device can process the first webpage HTML code in order to render the first webpage on a display of the user device and to execute instructions (e.g., javascript and/or HTML tags) included in and/or referenced by the first webpage source code. At step 220, the user device sends a request to an ad decision system (e.g., ad decisions system 105) for indicia of one or more impression opportunities. In some embodiments, the first webpage can include instructions (e.g., javascript and/or HTML tags) that, when executed by the user device, can cause the user device to send a request for the indicia of one or more impression opportunities to an ad decision system. For example, the first webpage can include a script (e.g., javascript) that causes the user device to request from the ad decision system the indicia of one or more impression opportunities.

At step 225, the ad decision system responds with indicia of one or more impression opportunities. In some embodiments, the ad decision system can respond to the user device with a character string including the indicia of one or more impression opportunities. In some embodiments, the ad decision system can respond with instructions (e.g., JAVASCRIPT™ and/or HTML tags) that, when executed by the user device, can cause the user device to set the value of a variable (e.g., a JAVASCRIPT™ variable) as the indicia of one or more impression opportunities.

As noted above, the indicia of one or more impression opportunities can identify impression opportunities (e.g., a top banner on a webpage, etc.). In some applications, a publisher ad server (e.g., the publisher ad server 115) can be configured such that certain keywords are recognized as an indication that the ad decision system can provide ads for the impression opportunities associated with the keywords. The indicia can include one or more keywords associated with impression opportunities. For example, the keyword "imp728" can correspond to a 728×90 pixel impression opportunity across the top of a webpage (e.g., the banner); the keyword "imp300" can correspond to a 300×250 pixel impression opportunity along the side of a webpage; and the keyword "imp160" can correspond to a 160×600 pixel impression opportunity. An exemplary response by the ad decision system can include "imp728;imp300;" as indicia of the 728×90 pixel impression opportunity and the 300×250 pixel impression opportunity.

In some embodiments, the ad decision system can selectively determine for which impression opportunities it will send indicia (e.g., to indicate the impression opportunities for which it can provide ads). In some embodiments, the ad decision system can determine whether it is desirable to purchase an impression opportunity when the expected value of the impression opportunity (e.g., based on estimated likelihood of the user clicking on the ad) exceeds the cost of the impression opportunity. For example, the ad decision system can determine that it is desirable to purchase the 300×250 pixel impression opportunity and the 160×600 pixel impression opportunity. The ad decision system can send indicia of the 300×250 pixel impression opportunity and the 160×600 pixel impression opportunity (e.g., keywords "imp300;imp160;") to the user device.

At step 230, the user device stores the indicia of one or more impression opportunities received from the ad decision system. In some embodiments, the indicia can be stored as a cookie set on the domain of the first webpage. For example, the first webpage can include instructions (e.g., javascript) to store as a cookie the value of a variable containing the indicia of one or more impression opportunities. It should be appreciated that the illustrated example depicts one of many possible sequences of steps. In some instances, the user device can process the first webpage (e.g., as described below with respect to steps 235 through 245) before the ad decision system sends the indicia of one or more impression opportunities (e.g., as described with respect to step 225). As will be described in greater detail below, the user device can utilize stored indicia of one or more impression opportunities.

At step 235, the user device sends a request to a publisher ad server (e.g., publisher ad server 115) for an ad for displaying in an impression opportunity on the first webpage. In some embodiments, the request includes the indicia of one or more impression opportunities. For example, the indicia can be appended as parameters to the URL of the request to the publisher ad server, so that the indicia are passed to the publisher ad server.

At step 240, the publisher ad server responds with an ad or ad tag. In some embodiments, the publisher ad server determines which ad or ad tag to send based in part on the indicia of one or more impression opportunities included in the request that it received from the user device (e.g., the publisher ad server can use a keyword targeting feature). In some embodiments, the publisher ad server can send a URL of the selected ad. In some embodiments, the publisher ad server can send an ad tag that, when processed by the user device, directs the user device to the location from which to retrieve the selected ad.

At step 245, the user device displays the ad in the location of the impression opportunity on the webpage. In some embodiments, the user device can obtain the ad for the impression opportunity from a URL provided by the publisher ad server. In some embodiments, the user device can obtain the ad for the impression opportunity by processing an ad tag provided by the publisher ad server (or by processing a series of ad tags).

At step 250, the user device sends a request for a second webpage to the publisher webserver. For example, the user device can request an updated version of the first webpage requested in step 205 or the user device can request another webpage hosted by the publisher. In some embodiments, the request can be in accordance with the HTTP protocol (e.g., an HTTP GET method). At step 255, the publisher webserver sends the second webpage to the requesting user device. In some embodiments, the response can be in accordance with the HTTP protocol. At step 260, the user device processes the second webpage. For example, the web browser can process the second webpage source code in order to render the second webpage on a display of the user device and to execute instructions (e.g., JAVASCRIPT™ and/or HTML tags) included in and/or referenced by the second webpage source code.

At step 265, the user device retrieves stored indicia of one or more impression opportunities. As described above, the user device can store the indicia of one or more impression opportunities received from the ad decision system during the display of a previous webpage (e.g., the first webpage displayed in step 230). In some embodiments, the second webpage can include instructions (e.g., JAVASCRIPT™ and/or HTML tags) that, when executed by the user device, can cause the user device to retrieve the stored indicia of one or more impression opportunities. For example, the user device can retrieve the indicia of one or more impression opportunities stored in a cookie set on the domain of the first webpage requested in step 230 (e.g., when the second webpage is on the same domain as the first webpage). The second webpage can include instructions (e.g., JAVASCRIPT™) to retrieve from a cookie the indicia of one or more impression opportunities and set the value of a variable to the indicia of one or more impression opportunities.

At step 270, the user device sends a request to the ad decision system for updated indicia of one or more impression opportunities. In some embodiments, the second webpage can include instructions (e.g., JAVASCRIPT™ and/or HTML tags) that, when executed by the user device, can cause the user device to send a request for the updated indicia of one or more impression opportunities to the ad decision system. For example, the second webpage can include a script (e.g., JAVASCRIPT™) that causes the user device to request from the ad decision system the updated indicia of one or more impression opportunities. In some embodiments, the user device can provide the indicia retrieved in step 265 along with the request.

At step 275, the user device sends a request to the publisher ad server for an ad for displaying in an impression opportunity on the second webpage. In some embodiments, the request includes the indicia of one or more impression opportunities. For example, the indicia can be appended as parameters to the URL specified for the publisher ad server. In the illustrated embodiment, the user device has not yet received a response to its request for updated indicia of one or more impression opportunities (e.g., step 270). The user device can provide the indicia of one or more impression opportunities retrieved in step 265.

At step 280, the publisher ad server responds with an ad or ad tag. In some embodiments, the publisher ad server determines which ad or ad tag to send based in part on the indicia of one or more impression opportunities included in the request that it received from the user device (e.g. the publisher ad server can use a keyword targeting feature). In some embodiments, the publisher ad server can send a URL of the selected ad. In some embodiments, the publisher ad server can send an ad tag that, when processed by the user device, directs the user device to the location from which to retrieve the selected ad.

At step 285, the user device displays the ad in the location of the impression opportunity on the second webpage. In some embodiments, the user device can obtain the ad for the impression opportunity from a URL provided by the publisher ad server. In some embodiments, the user device can obtain the ad for the impression opportunity by processing an ad tag provided by the publisher ad server.

At step 290, the ad decision system responds with updated indicia of one or more impression opportunities. The ad decision system can respond in any of the ways described above.

At step 295, the user device stores the updated indicia of one or more impression opportunities received from the ad decision system. In some embodiments, the updated indicia can be stored as a cookie set on the domain of the requested second webpage. For example, the received second webpage can include instructions (e.g., JAVASCRIPT™) to store as a cookie the value of a variable containing the updated indicia of one or more impression opportunities.

The illustrated example depicts a possible sequence of steps. It should be appreciated that steps can occur in different order. For example, the user device can process the webpage and request indicia of one or more impression opportunities from the ad decision system in parallel. The user device can request an ad (e.g., as in step 235) before the ad decision system sends indicia of one or more impression opportunities (e.g., as in step 225). In some embodiments, the user device can provide an empty string to the ad server (e.g., when the ad decision system has not provided indicia of one or more impression opportunities yet or when the ad decision system determines that none of the impression opportunities are desired). In some embodiments, the user device can provide indicia of one or more impression opportunities received while processing a previous webpage (e.g., as described with respect, to steps 250 through 295).

Domain Redirection

Figure 3A:
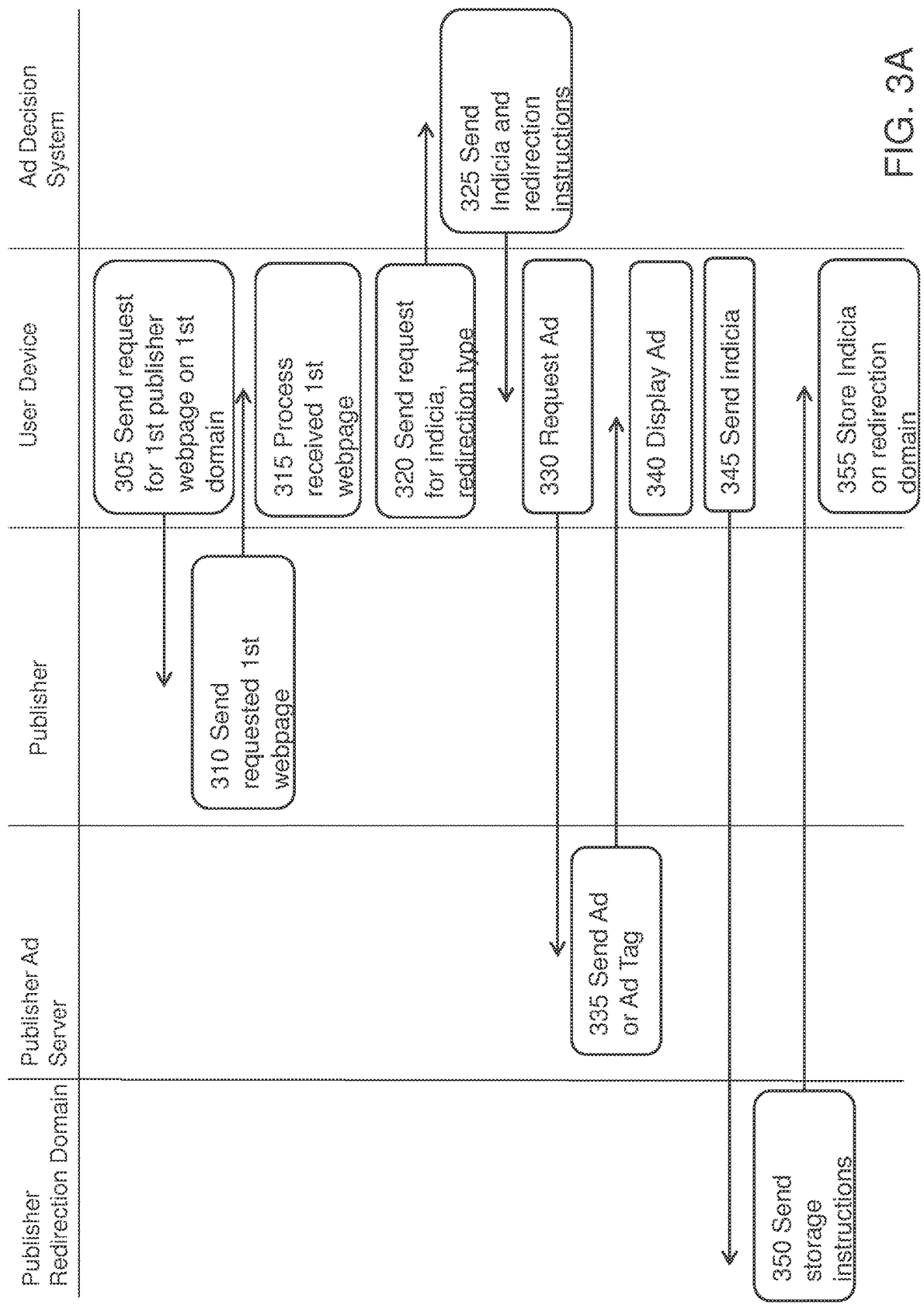
FIGS. 3A and 3B depict a flow chart illustrating a method of providing ads to a user device utilizing domain redirection in accordance with an embodiment of the technology.
Figure 3B:
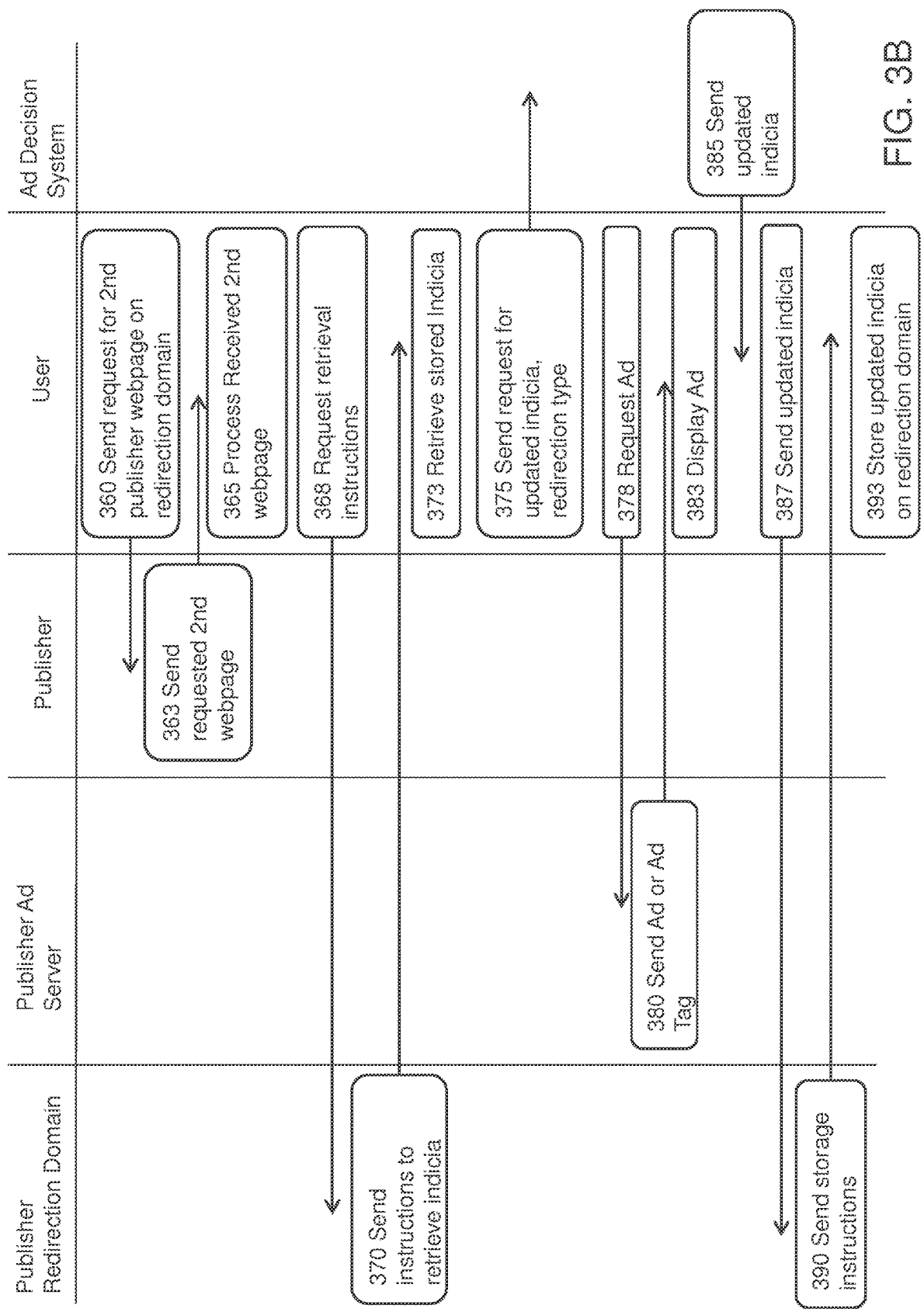

FIGS. 3A and 3B depict a flow chart illustrating a method of providing ads to a user device utilizing domain redirection in accordance with an embodiment of the technology. At step 305, a user device (e.g., user device 125) sends a request for a first webpage on a first domain (e.g., the domain of the publisher's homepage) to a publisher webserver (e.g., webserver 110). In some embodiments, the request can be in accordance with the HTTP protocol (e.g., an HTTP GET method). At step 310, the publisher webserver sends the first webpage to the user device. In some embodiments, the response can be in accordance with the HTTP protocol. At step 315, the user device processes the received first webpage. For example, the user device can process the first webpage HTML code in order to render the first webpage on a display of the user device and to execute instructions (e.g., JAVASCRIPT™ and/or HTML tags) included in and/or referenced by the first webpage source code.

In some embodiments, the first webpage can include a redirection type and/or redirection URL. For example, the first webpage source code can include instructions that, when processed by the user device, initialize javascript variables with values of the redirection type and/or redirection domain. In some embodiments, the first webpage can include one or more key-values associated with the one or more impression opportunities.

At step 320, the user device sends a request to an ad decision system (e.g., ad decisions system 105) for indicia of one or more impression opportunities. In some embodiments, the first webpage can include instructions (e.g., JAVASCRIPT™ and/or HTML tags) that, when executed by the user device, can cause the user device to send a request for the indicia of one or more impression opportunities to an ad decision system. For example, the first webpage can include a script (e.g., JAVASCRIPT™) that causes the user device to request from the ad decision system the indicia of one or more impression opportunities.

In some embodiments, the user device can send the redirection type and/or redirection domain. As will be described in greater detail below, the redirection type can be a variable that indicates the type of redirection to be used (e.g., HTTP response status code 302, javascript, HTML image tags, etc.). The redirection domain can be, e.g., a URL of a computing system on a redirection domain (e.g., a domain chosen by the publisher with which to associate the indicia of one or more impression opportunities). In some embodiments, the user device can send the key-values to the ad decision system.

At step 325, the ad decision system sends indicia of one or more impression opportunities and redirection instructions to the user device. In some embodiments, the ad decision system can respond to the user device with a character string including the indicia of one or more impression opportunities. In some embodiments, the ad decision system can respond with instructions (e.g., JAVASCRIPT™ and/or HTML tags) that, when executed by the user device, can cause the user device to set the value of a variable (e.g., a JAVASCRIPT™ variable) as the indicia of one or more impression opportunities.

As described above, the indicia of one or more impression opportunities can identify impression opportunities (e.g., a top banner on a webpage, etc.). The indicia can include one or more keywords associated with impression opportunities. For example, the keyword "imp728" can correspond to a 728×90 pixel impression opportunity across the top of a webpage (e.g., the banner); the keyword "imp300" can correspond to a 300×250 pixel impression opportunity along the side of a webpage; and the keyword "imp160" can correspond to a 160×600 pixel impression opportunity. An exemplary response by the ad decision system can include "imp728;imp300" as indicia of the 728×90 pixel impression opportunity and the 300×250 pixel impression opportunity.

In some embodiments, the ad decision system can selectively determine for which impression opportunities it will send indicia (e.g., to indicate the impression opportunities for which it can provide ads). In some embodiments, the ad decision system can determine whether it is desirable to purchase an impression opportunity when the expected value of the impression opportunity (e.g., based on estimated likelihood of the user clicking on the ad) exceeds the cost of the impression opportunity. For example, the ad decision system can determine that it is desirable to purchase the 300×250 pixel impression opportunity and the 160×600 pixel impression opportunity. The ad decision system can send indicia of the 300×250 pixel impression opportunity and the 160×600 pixel impression opportunity (e.g., "imp300;imp160;") to the user device.

In some embodiments, the redirection instructions can include an HTTP response status code 302. The HTTP response status code 302 can redirect the user device to a URL provided with the HTTP response status code 302. For example, the HTTP response including status code 302 can provide the redirection URL with the indicia of one or more impression opportunities appended as parameters. In some embodiments, the redirection instructions can include one or more JAVASCRIPT™ instructions. The JAVASCRIPT™ instruction can redirect the user device to a URL specified in the JAVASCRIPT™ instructions. For example, the JAVASCRIPT™ instructions can provide the redirection URL in a variable and instructions causing the user device to redirect to the redirection URL, passing the indicia of one or more impression opportunities appended as parameters. In some embodiments, the redirection instructions can include one or more HTML image tags. The HTML image tags can redirect the user device to a URL provided in the HTML image tag. For example, the HTML image tag can include the redirection URL with the indicia of one or more impression opportunities appended as parameters.

In some embodiments, the redirection instructions can include a duration of time associated with the indicia of the one or more impression opportunities. The duration of time can indicate the amount of time for which the indicia of the one or more impression opportunities is still valid. In some embodiments, the redirection instructions can include instructions for redirecting to a subdomain of the redirection URL.

At step 330, the user device sends a request to a publisher ad server (e.g., publisher ad server 115) for an ad for displaying in an impression opportunity on the first webpage. In some embodiments, the request includes the indicia of one or more impression opportunities. For example, the indicia can be appended as parameters to the URL specified for the publisher ad server.

At step 335, the publisher ad server responds with an ad or ad tag. In some embodiments, the publisher ad server determines which ad or ad tag to send based in part on the indicia of one or more impression opportunities included in the request that it received from the user device. In some embodiments, the publisher ad server can send a URL of the selected ad. In some embodiments, the publisher ad server can send an ad tag that, when processed by the user device, directs the user device to the location of the selected ad.

At step 340, the user device displays the ad in the location of the impression opportunity on the first webpage. In some embodiments, the user device can obtain the ad for the impression opportunity from a URL provided by the publisher ad server. In some embodiments, the user device can obtain the ad for the impression opportunity by processing an ad tag provided by the publisher ad server.

At step 345, the user device sends the indicia of one or more impression opportunities to the computer system on the redirection domain in accordance with the redirection instructions. For example, if the redirection instructions include an HTTP response status code 302, the user device can be redirected to the redirection URL. By appending the indicia of one or more impression opportunities to the redirection URL, the indicia of one or more impression opportunities can be sent to the computer system at the redirection URL. If the redirection instructions include javascript instructions, the javascript instructions, when processed by the user device, can cause the user device to make a call to the redirection URL passing the indicia of one or more impression opportunities to the computer system at the redirection URL. If the redirection instructions include one or more HTML image tags, the image tags, when processed by the user device, can cause the user device to make a call to the computer system at the redirection URL. By appending the indicia of one or more impression opportunities to the redirection URL as parameters, the indicia of one or more impression opportunities can be sent to the computer system at the redirection URL. In some embodiments, the user device can send the duration of time associated with the indicia of the one or more impression opportunities to the computer system at the redirection URL.

At step 350, the computer system at the redirection URL sends storage instructions. In some embodiments, the storage instructions specify how the user device should store the indicia of one or more impression opportunities. For example, the storage instructions, when processed by the user device, can store the indicia of one or more impression opportunities in a cookie set on the redirection domain or a domain associated with the redirection domain (e.g., a subdomain of the redirection domain). In some embodiments, the storage instructions can include a duration of time (e.g., as included in the redirection instructions) indicating how long the user device should store the indicia of one or more impression opportunities. In some embodiments, the storage instructions can include a subdomain level (e.g., as included in the redirection instructions) indicating at which subdomain level the stored indicia should be associated. For example, if the redirection domain is sub1.sub2.domain.com, a subdomain level of 2 would indicate that the stored indicia should be associated with the second domain level (e.g., sub2.domain.com).

At step 355, the user device stores the indicia of one or more impression opportunities as specified by the storage instructions. In some embodiments, the indicia of one or more impression opportunities are stored for a duration of time, and deleted thereafter (e.g., the ad decision system can specify the duration of time when providing the indicia of one or more impression opportunities and the indicia of one or more ad buyers). In some embodiments, the indicia can be stored as a cookie set on the domain of the redirection URL (or a subdomain thereof) as described above. For example, the storage instructions can include instructions (e.g., JAVASCRIPT™) to store as a cookie the value of a variable containing the indicia of one or more impression opportunities.

At step 360, the user device sends a request for a second webpage to the publisher webserver. For example, the user device can request an updated version of the first webpage requested in step 305 or another webpage hosted by the publisher webserver. In some embodiments, the request can be in accordance with the HTTP protocol (e.g., an HTTP GET method). At step 363, the publisher webserver sends the requested second webpage to the user device. In some embodiments, the response can be in accordance with the HTTP protocol. At step 365, the user device processes the second webpage. For example, the browser can process the second webpage source code in order to render the second webpage on a display of the user device and to execute instructions (e.g., javascript and/or HTML tags) included in and/or referenced by the second webpage source code.

At step 368, the user device requests retrieval instructions. In some embodiments, the user device requests retrieval instruction from the computer system at the redirection URL. For example, the second webpage can include instructions (e.g., JAVASCRIPT™) that, when processed by the user device, causes the user device to request retrieval instructions from a server on the redirection domain. At step 370, the computer system at the redirection URL sends instructions to retrieve indicia of one or more impression opportunities (e.g., as stored in step 355). At step 373, the user device retrieves the stored indicia of one or more impression opportunities as specified in the retrieval instructions. For example, the user device can retrieve the indicia of one or more impression opportunities from a cookie set on the redirection domain, or a domain associated with the redirection domain.

At step 375, the user device sends a request to the ad decision system (e.g., ad decisions system 105) for updated indicia of one or more impression opportunities. In some embodiments, the second webpage can include instructions (e.g., JAVASCRIPT™ and/or HTML tags) that, when executed by the user device, can cause the user device to send a request for the updated indicia of one or more impression opportunities to the ad decision system. For example, the second webpage can include a script (e.g., JAVASCRIPT™) that causes the user device to request from the ad decision system the updated indicia of one or more impression opportunities.

At step 378, the user device sends a request to the publisher ad server for an ad for displaying in an impression opportunity on the second webpage. In some embodiments, the request includes the indicia of one or more impression opportunities. For example, the indicia can be appended as parameters to the URL specified for the publisher ad server. In the illustrated embodiment, the user device has not received a response to its request for updated indicia of one or more impression opportunities (e.g., step 375). The user device can provide the indicia of one or more impression opportunities retrieved in step 373.

At step 380, the user device sends a request to the publisher ad server for an ad for displaying in an impression opportunity on the second webpage. In some embodiments, the request includes the indicia of one or more impression opportunities. For example, the indicia can be appended as parameters to the URL specified for the publisher ad server.

At step 383, the user device displays the ad in the location of the impression opportunity on the second webpage. In some embodiments, the user device can obtain the ad for the impression opportunity from a URL provided by the publisher ad server. In some embodiments, the user device can obtain the ad for the impression opportunity by processing an ad tag provided by the publisher ad server.

At step 385, the ad decision system responds with updated indicia of one or more impression opportunities and redirection instructions. In some embodiments, the ad decision system can respond to the user device with a character string including the updated indicia of one or more impression opportunities. In some embodiments, the ad decision system can respond with instructions (e.g., javascript and/or HTML tags) that, when executed by the user device, can cause the user device to set the value of a variable (e.g., a javascript variable) as the updated indicia of one or more impression opportunities.

At step 387, the user device sends the updated indicia of one or more impression opportunities to the computer system on the redirection domain in accordance with the redirection instructions. In some embodiments, the user device can send the duration of time associated with the updated indicia of the one or more impression opportunities to the computer system at the redirection URL. In some embodiments, the user device can send the subdomain level to the computer system at the redirection URL.

At step 390, the computer system at the redirection URL sends storage instructions. In some embodiments, the storage instructions specify how the user device should store the updated indicia of one or more impression opportunities. For example, the storage instructions, when processed by the user device, can store the updated indicia of one or more impression opportunities in a cookie set on the redirection domain or a domain associated with the redirection domain (e.g., a subdomain of the redirection domain). In some embodiments, the storage instructions can include a duration of time (e.g., as included in the redirection instructions) indicating how long the user device should store the updated indicia of one or more impression opportunities. In some embodiments, the storage instructions can include a subdomain level (e.g., as included in the redirection instructions) indicating at which subdomain level the stored indicia should be associated.

At step 393, the user device stores the updated indicia of one or more impression opportunities as specified by the storage instructions. In some embodiments, the updated indicia of one or more impression opportunities are stored for a duration of time, and deleted thereafter (e.g., the ad decision system can specify the duration of time when providing the updated indicia of one or more impression opportunities and the indicia of one or more ad buyers). In some embodiments, the updated indicia can be stored as a cookie set on the domain of the redirection URL (or a subdomain thereof) as described above. For example, the second webpage can include instructions (e.g., JAVASCRIPT™) to store as a cookie the value of a variable containing the updated indicia of one or more impression opportunities.

Beneficially, the embodiment described above permits the publisher to control with which domain the stored indicia of one or more impression opportunities are associated. It should be appreciated that the redirection domain can be any domain, e.g., chosen by the publisher, that the publisher controls. In some embodiments, the redirection domain can be the same domain on which the publisher ad server sits or the same domain on which the publisher webserver sits. In some embodiments, the redirection domain can be a different domain from the domain on which the publisher ad server sits or the same domain on which the publisher webserver sits.

The illustrated example depicts a possible sequence of steps. It should be appreciated that steps can occur in different order. For example, the user device can process the webpage and request indicia of one or more impression opportunities from the ad decision system in parallel. The user device can request an ad (e.g., as in step 330) before the ad decision system sends indicia of one or more impression opportunities (e.g., as in step 325). In some embodiments, the user device can provide an empty string to the ad server (e.g., when the ad decision system has not provided indicia of one or more impression opportunities yet or when the ad decision system determines that none of the impression opportunities are desired). In some embodiments, the user device can provide indicia of one or more impression opportunities received while processing a previous webpage (e.g., as described with respect to steps 360 through 393).

Ad Decision System Method

Figure 4:
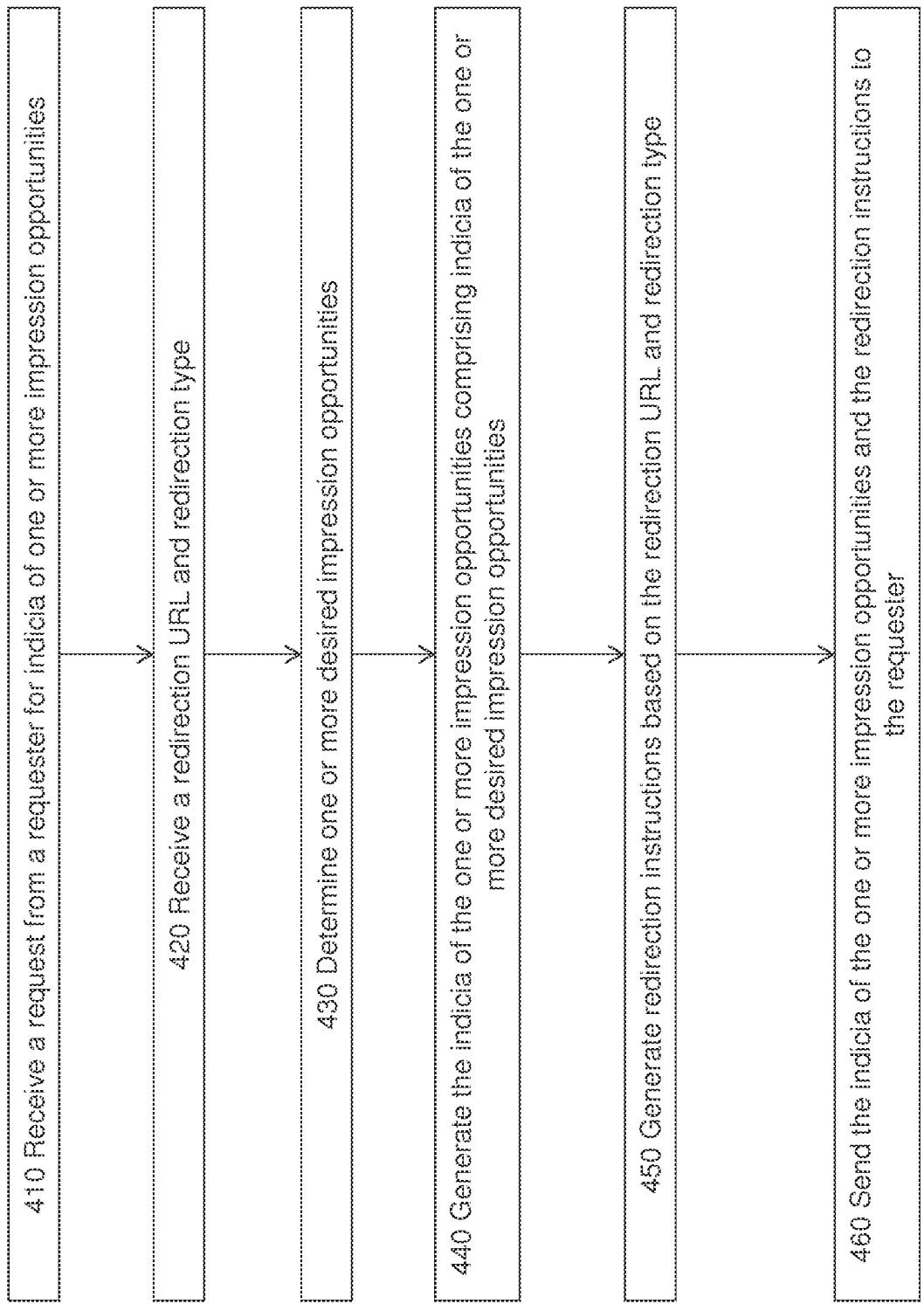
FIG. 4 depicts a flow chart illustrating a method performed by an ad decision system in accordance with an embodiment of the technology.

FIG. 4 depicts a flow chart illustrating a method performed by an ad decision system in accordance with an embodiment of the technology. In some embodiments, the illustrated method can be performed by an ad decision system (e.g., ad decision system 105). At step 410, the ad decision system can receive a request from a requester for indicia of one or more impression opportunities (e.g., as described with respect to step 320 of FIG. 3A and/or step 375 of FIG. 3B). At step 420, the ad decision system can receive a redirection URL and redirection type (e.g., as described with respect to step 320 of FIG. 3A and/or step 375 of FIG. 3B). At step 430, the ad decision system can determine one or more desired impression opportunities (e.g., as described with respect to step 325 of FIG. 3A and/or step 385 of FIG. 3B). At step 440, the ad decision system can generate the indicia of the one or more impression opportunities comprising indicia of the one or more desired impression opportunities (e.g., as described with respect to step 325 of FIG. 3A and/or step 385 of FIG. 3B). At step 450, the ad decision system can generate redirection instructions based on the redirection URL and redirection type (e.g., as described with respect to step 325 of FIG. 3A and/or step 385 of FIG. 3B). At step 460, the ad decision system can send the indicia of the one or more impression opportunities and the redirection instructions to the requester (e.g., as described with respect to step 325 of FIG. 3A and/or step 385 of FIG. 3B).

User Device Method

Figure 5:
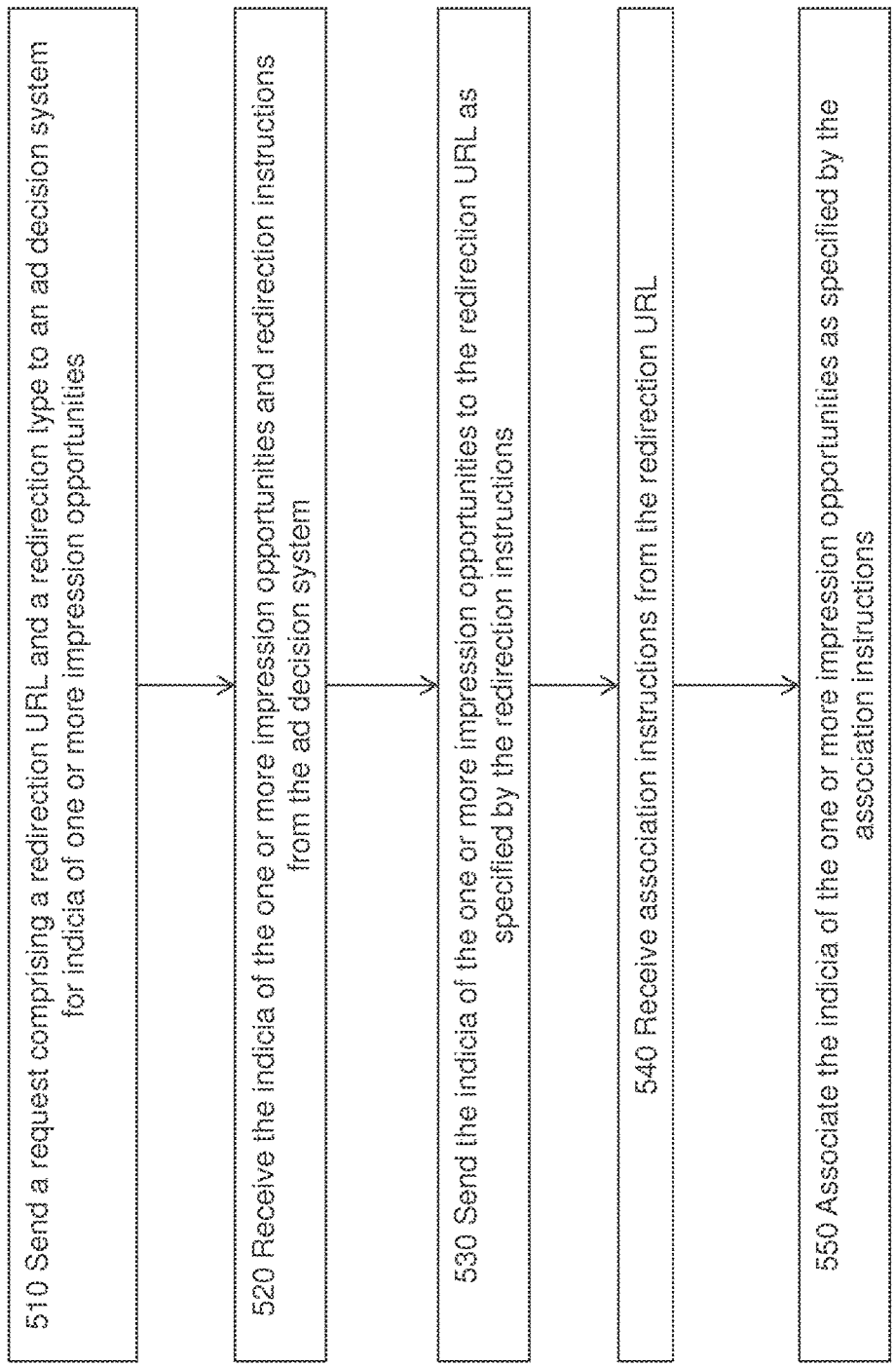
FIG. 5 depicts a flow chart illustrating a method performed by an ad decision system in accordance with an embodiment of the technology.

FIG. 5 depicts a flow chart illustrating a method performed by a user device in accordance with an embodiment of the technology. In some embodiments, the illustrated method can be performed by a user device (e.g., user device 125). At step 510, the user device can send a request comprising a redirection URL and a redirection type to an ad decision system for indicia of one or more impression opportunities (e.g., as described with respect to step 320 of FIG. 3A and/or step 375 of FIG. 3B). At step 520, the user device can receive the indicia of the one or more impression opportunities and redirection instructions from the ad decision system (e.g., as described with respect to step 325 of FIG. 3A and/or step 385 of FIG. 3B). At step 530, the user device can send the indicia of the one or more impression opportunities to the redirection URL as specified by the redirection instructions (e.g., as described with respect to step 345 of FIG. 3A and/or step 387 of FIG. 3B). At step 540, the user device can receive association instructions from the redirection URL (e.g., as described with respect to step 350 of FIG. 3A and/or step 390 of FIG. 3B). At step 550, the user device can associate the indicia of the one or more impression opportunities as specified by the association instructions (e.g., as described with respect to step 355 of FIG. 3A and/or step 393 of FIG. 3B).

Publisher Systems Method

Figure 6:
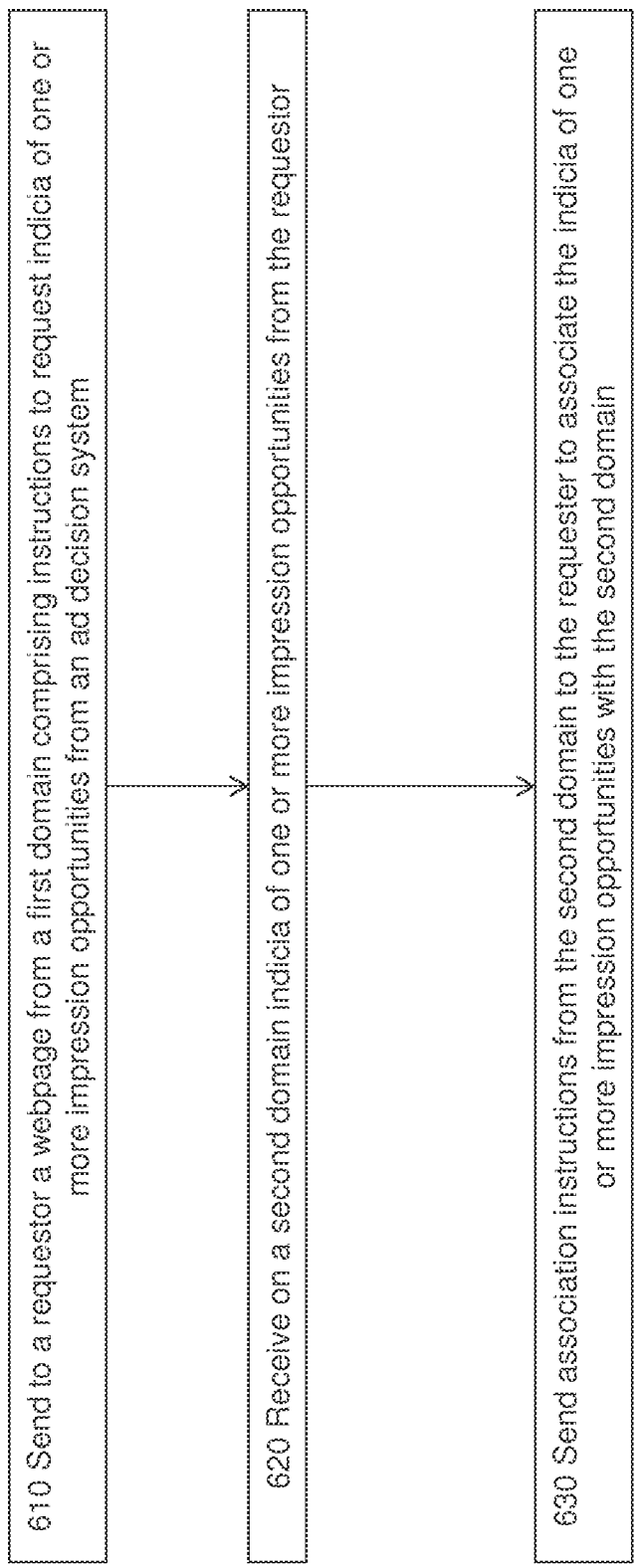
FIG. 6 depicts a flow chart illustrating a method performed by one or more publisher systems in accordance with an embodiment of the technology.

FIG. 6 depicts a flow chart illustrating a method performed by one or more publisher systems in accordance with an embodiment of the technology. In some embodiments, the illustrated method can be performed by one or more publisher systems (e.g., publisher webserver 110 and/or publisher ad server 115). At step 610, the one or more publisher servers can send to a requestor a webpage from a first domain comprising instructions to request indicia of one or more impression opportunities from an ad decision system (e.g., as described with respect to step 310 of FIG. 3A). At step 620, the one or more publisher servers can receive on a second domain indicia of one or more impression opportunities from the requestor (e.g., as described with respect to step 345 of FIG. 3A). At step 630, the one or more publisher servers can send association instructions from the second domain to the requester to associate the indicia of one or more impression opportunities with the second domain (e.g., as described with respect to step 350 of FIG. 3A).

Some embodiments of the technology are described above with reference to webpages. It should be appreciated that the technology can be applied to selecting and/or providing advertisements for any digital asset that includes one or more impression opportunities. Digital assets can include webpages, multi-media items, applications, etc. As an example, the technology can be applied to selecting and/or providing advertisements for display in impression opportunities in an application (e.g., an application on a personal computer, an application on a mobile computing device, etc.).

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites.

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, both general and special purpose microprocessors, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and BLU-RAY™ disks. The processor and the memory can be supplemented by and/or incorporated in special purpose logic circuitry.

To provide for interaction with a user, the above described techniques can be implemented on a computer in communication with a display device, e.g., a CRT (cathode ray tube), plasma, or LCD (liquid crystal display) monitor, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of a computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), BLUETOOTH™, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), a Peer-to-Peer (P2P) protocol, Hypertext Transfer Protocol (HTTP), Session Initiation Protocol (SIP), a Global System for Mobile Communications (GSM) protocol, Universal Mobile Telecommunications System (UMTS), 3GPP Long Term Evolution (LTE) and/or other communication protocols.

Devices of a computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device includes, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein.

What is claimed is:

1. A method comprising:
    receiving, by a first computing system on a first domain, from a requesting computing device in response to the requesting computing device processing a first webpage on a second domain, a request for indicia of one or more impression opportunities;
    receiving, by the first computing system, from the requesting computing device, a redirection uniform resource locator (URL) and redirection type;
    determining, by the first computing system, one or more desired impression opportunities, each of the one or more desired impression opportunities representing a location in a webpage for displaying an advertisement;
    generating, by the first computing system, the indicia of the one or more impression opportunities comprising indicia of the one or more desired impression opportunities, the indicia not comprising the advertisement;
    generating, by the first computing system, redirection instructions based on the redirection URL and redirection type;
    sending, by the first computing system, the indicia of the one or more impression opportunities and the redirection instructions to the requesting computing device;
    receiving, by a second computing system, a request from the requesting computing device for a digital advertisement for display in at least one of the one or more impression opportunities, the request including the indicia of the one or more impression opportunities;
    determining, by the second computing system, one or more desired digital advertisements based upon the indicia of the one or more impression opportunities received from the requesting computing device;
    sending, by the second computing system, at least one of a URL or a tag corresponding to the one or more desired digital advertisements to the requesting computing device;
    displaying, by the requesting computing device, the one or more desired digital advertisements in the one or more impression opportunities in the first webpage using the URL or the tag received from the second computing system;
    sending, by the requesting computing device after display of the one or more desired digital advertisements, the indicia of the one or more impression opportunities to a third computing system on a third domain as specified by the redirection instructions;
    generating, by the third computing system, association instructions for the indicia of the one or more impression opportunities, wherein the association instructions comprise a first subdomain level at which to store the indicia of the one or more impression opportunities, the first subdomain level corresponding to a subdomain associated with the third domain as referenced in the redirection URL of the redirection instructions;
    sending, by the third computing system, the association instructions to the requesting computing device; and
    storing, by the requesting computing device, the indicia of the one or more impression opportunities as specified by the association instructions,
    wherein the indicia of the one or more impression opportunities are stored in association with the third domain.

2. The method of claim 1, wherein the redirection instructions comprise a Hypertext Transfer Protocol (HTTP) response directing the requesting computing device to the redirection URL.

3. The method of claim 1, wherein the redirection instructions comprise one or more script instructions directing the requesting computing device to the redirection URL.

4. The method of claim 1, wherein the redirection instructions comprise one or more HyperText Markup Language (HTML) image tags directing the requesting computing device to the redirection URL.

5. The method of claim 1, wherein the redirection instructions comprise a duration of time associated with the indicia of the one or more impression opportunities.

6. The method of claim 1, further comprising receiving, by the first computing system, one or more key-values associated with the one or more impression opportunities from the requesting computing device.

7. The method of claim 6, wherein determining, by the first computing system, one or more desired impression opportunities is based at least in part on the one or more key-values.

8. The method of claim 1, wherein the indicia of the one or more impression opportunities comprise one or more keywords associated with an ad server.

9. The method of claim 1, wherein the association instructions comprise instructions directing the requesting computing device to store the indicia of the one or more impression opportunities as a browser cookie on the third domain.

10. The method of claim 1, further comprising:
    receiving, by the third computing system on the third domain, from the requesting computing device in response to the requesting computing device processing a second webpage on the second domain, a request for retrieval instructions associated with indicia of one or more impression opportunities on the second webpage;
    generating, by the third computing system, retrieval instructions for retrieval of the indicia of the one or more impression opportunities;
    sending, by the third computing system, the retrieval instructions to the requesting computing device;
    retrieving, by the requesting computing device, the indicia of the one or more impression opportunities on the webpage as stored by the requesting computing device in conjunction with the association instructions;
    receiving, by the first computing system on the first domain, from the requesting computing device in response to the requesting computing device processing the second webpage on the second domain, a request for updated indicia of the one or more impression opportunities;
    prior to the requesting computing device receiving a response to the request for updated indicia of the one or more impression opportunities;
        receiving, by the second computing system, a request from the requesting computing device for a digital advertisement for display in at least one of the one or more impression opportunities on the second webpage, the request including the indicia of the one or more impression opportunities;

determining, by the second computing system, one or more desired digital advertisements based upon the indicia of the one or more impression opportunities received from the requesting computing device;

sending, by the second computing system, at least one of a URL or a tag corresponding to the one or more desired digital advertisements to the requesting computing device;

displaying, by the requesting computing device, the one or more desired digital advertisements in the one or more impression opportunities in the second webpage using the URL or the tag received from the second computing system;

receiving, by the requesting computing device, from the first computing system on the first domain, the updated indicia of the one or more impression opportunities;

sending, by the requesting computing device, the updated indicia of the one or more impression opportunities to the third computing system on the third domain as specified by the redirection instructions;

generating, by the third computing system, association instructions for the updated indicia of the one or more impression opportunities, wherein the association instructions comprise a second subdomain level at which to store the updated indicia of the one or more impression opportunities, the second subdomain level corresponding to a subdomain associated with the third domain as referenced in the redirection URL of the redirection instructions;

sending, by the third computing system, the association instructions to the requesting computing device; and storing, by the requesting computing device, the updated indicia of the one or more impression opportunities as specified by the association instructions, wherein the updated indicia of the one or more impression opportunities are stored in association with the third domain.

11. The method of claim 10, wherein the second subdomain level is different from the first subdomain level.

12. A system comprising:

a first computing system on a first domain that:
receives, from a requesting computing device in response to the requesting computing device processing a webpage on a second domain, a request for indicia of one or more impression opportunities;

receives, from the requesting computing device, a redirection uniform resource locator (URL) and redirection type;

determines one or more desired impression opportunities, each of the one or more desired impression opportunities representing a location in a webpage for displaying an advertisement;

generates the indicia of the one or more impression opportunities comprising indicia of the one or more desired impression opportunities, the indicia not comprising the advertisement;

generates redirection instructions based on the redirection URL and redirection type; and sends the indicia of the one or more impression opportunities and the redirection instructions to the requesting computing device;

a second computing system that:
receives a request from the requesting computing device for a digital advertisement for display in at least one of the one or more impression opportunities, the request including the indicia of the one or more impression opportunities;

determines one or more desired digital advertisements based upon the indicia of the one or more impression opportunities received from the requesting computing device; and sends at least one of a URL or a tag corresponding to the one or more desired digital advertisements to the requesting computing device, wherein the requesting computing device displays the one or more desired digital advertisements in the one or more impression opportunities in the webpage using the URL or the tag received from the second computing system, and sends the indicia of the one or more impression opportunities to a third computing system on a third domain as specified by the redirection instructions;

the third computing system that:
after display of the one or more desired digital advertisements on the requesting computing device, generates association instructions for the indicia of the one or more impression opportunities and sends the association instructions to the requesting computing device, wherein the association instructions comprise a subdomain level at which to store the indicia of the one or more impression opportunities, the subdomain level corresponding to a subdomain associated with the third domain as referenced in the redirection URL of the redirection instructions; and the requesting computing device that:
stores the indicia of the one or more impression opportunities as specified by the association instructions, wherein the indicia of the one or more impression opportunities are stored in association with the third domain.

* * * * *